US008837306B2

(12) United States Patent
Vigue et al.

(10) Patent No.: US 8,837,306 B2
(45) Date of Patent: Sep. 16, 2014

(54) DETERMINATION OF A LIST OF PREFERRED MOBILE ACCESS NETWORKS

(75) Inventors: Helene Vigue, London (GB); Nicolas Martiquet, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/439,400

(22) PCT Filed: Jul. 24, 2007

(86) PCT No.: PCT/EP2007/057629
§ 371 (c)(1),
(2), (4) Date: Feb. 27, 2009

(87) PCT Pub. No.: WO2008/025618
PCT Pub. Date: Mar. 6, 2008

(65) Prior Publication Data
US 2009/0252059 A1 Oct. 8, 2009

(30) Foreign Application Priority Data
Aug. 31, 2006 (EP) .................................... 06291399

(51) Int. Cl.
H04W 48/16 (2009.01)
H04W 48/18 (2009.01)

(52) U.S. Cl.
CPC .............. H04W 48/16 (2013.01); H04W 48/18 (2013.01)
USPC ....................................................... 370/252

(58) Field of Classification Search
CPC ............................ H04L 43/12; H04L 43/0876
USPC ....................................................... 370/252
See application file for complete search history.

(56) References Cited

U.S. PATENT DOCUMENTS 5,761,618 A    6/1998  Lynch
5,920,821 A    7/1999  Seazholtz
6,480,558 B1*  11/2002 Ottosson et al. .............. 375/350

(Continued)

FOREIGN PATENT DOCUMENTS

EP    1406462 A2    4/2004
WO    0154435 A1    7/2001
WO    03047296 A1   6/2003

OTHER PUBLICATIONS

International Search Report and Written Opinion dated Nov. 12, 2007 for corresponding International Application No. PCT/EP2007/057629, filed Jul. 24, 2007.

Primary Examiner — John Blanton
Assistant Examiner — Jay P Patel
(74) Attorney, Agent, or Firm — David D. Brush; Westman, Champlin & Koehler, P.A.

(57) ABSTRACT

Telecommunications system including a network selection manager and a mobile node. The network selection manager is operable to determine a list of preferred mobile access networks to which the mobile node may be attached during an inactive state and to communicate the list of preferred mobile access networks to the mobile node. The list of preferred mobile access networks for selection is determined in accordance with operator determined conditions (e.g. load, congestion in the access networks, subscription info, location of the mobile, changes in the list since last communication to the Mobile Station, etc.). The mobile node is operable in the inactive state to select one of the plurality of mobile access networks which is available for attachment in dependence on the list of preferred mobile access networks communicated to the mobile node from the network selection manager.

8 Claims, 3 Drawing Sheets

(56) References Cited

U.S. PATENT DOCUMENTS

| | | | |
|---|---|---|---|
| 6,584,311 B1* | 6/2003 | Sorenson et al. | 455/432.1 |
| 7,096,015 B2* | 8/2006 | Bridges et al. | 455/432.1 |
| 7,139,570 B2* | 11/2006 | Elkarat et al. | 455/432.3 |
| 7,158,801 B1* | 1/2007 | Muhonen | 455/503 |
| 7,542,451 B2* | 6/2009 | Cooper et al. | 370/335 |
| 7,603,119 B1* | 10/2009 | Durig et al. | 455/432.3 |
| 7,606,242 B2* | 10/2009 | Whelan et al. | 370/401 |
| 7,684,373 B2* | 3/2010 | Ekvetchavit et al. | 370/335 |
| 7,702,329 B1* | 4/2010 | Durig et al. | 455/432.1 |
| 7,894,812 B1* | 2/2011 | Durig et al. | 455/432.3 |
| 7,920,846 B2* | 4/2011 | Wang | 455/411 |
| 8,155,092 B2* | 4/2012 | Mariblanca Nieves et al. | 370/338 |
| 2002/0085540 A1* | 7/2002 | Hyvarinen et al. | 370/352 |
| 2003/0095513 A1* | 5/2003 | Woodmansee et al. | 370/324 |
| 2003/0163558 A1* | 8/2003 | Cao et al. | 709/223 |
| 2004/0192306 A1 | 9/2004 | Elkarat | |
| 2004/0198220 A1* | 10/2004 | Whelan et al. | 455/41.1 |
| 2004/0233862 A1* | 11/2004 | Huang et al. | 370/320 |
| 2004/0236849 A1* | 11/2004 | Cooper et al. | 709/224 |
| 2005/0060319 A1 | 3/2005 | Douglas | |
| 2005/0091357 A1 | 4/2005 | Krantz | |
| 2005/0136949 A1* | 6/2005 | Barnes, Jr. | 455/461 |
| 2005/0147062 A1 | 7/2005 | Khouaja et al. | |
| 2005/0148299 A1* | 7/2005 | Buckley | 455/41.2 |
| 2005/0190716 A1* | 9/2005 | Buckley et al. | 370/328 |
| 2005/0227692 A1* | 10/2005 | Kawashima et al. | 455/435.2 |
| 2006/0046661 A1* | 3/2006 | Ekvetchavit et al. | 455/67.11 |
| 2006/0068832 A1* | 3/2006 | Islam et al. | 455/528 |
| 2006/0135143 A1* | 6/2006 | Suematsu | 455/418 |
| 2006/0154699 A1* | 7/2006 | Ko et al. | 455/574 |
| 2006/0259951 A1* | 11/2006 | Forssell et al. | 726/1 |
| 2007/0089161 A1* | 4/2007 | Waris | 726/1 |
| 2007/0142046 A1* | 6/2007 | Welnick | 455/434 |
| 2007/0238460 A1* | 10/2007 | Yamen | 455/436 |
| 2007/0287419 A1* | 12/2007 | Wang | 455/411 |
| 2008/0117884 A1* | 5/2008 | Ishii et al. | 370/338 |
| 2009/0196265 A1* | 8/2009 | Mariblanca Nieves et al. | 370/338 |
| 2010/0322198 A1* | 12/2010 | Friday et al. | 370/332 |

\* cited by examiner

DETERMINATION OF A LIST OF PREFERRED MOBILE ACCESS NETWORKS

CROSS-REFERENCE TO RELATED APPLICATIONS

This Application is a Section 371 National Stage Application of International Application No. PCT/EP2007/057629, filed Jul. 24, 2007, which is incorporated by reference in its entirety and published as WO 2008/025618 A1 on Mar. 6, 2008, in English.

FIELD OF THE INVENTION

The present invention relates to a telecommunications system and method for providing a facility for mobile nodes to communicate via a plurality of mobile access networks.

BACKGROUND OF THE INVENTION

Mobile access networks provide a facility for mobile nodes to communicate data so that a variety of services can be provided to mobile users. As a mobile node roams through a geographical area, the mobile node may have an opportunity to become attached to and to communicate data via different mobile access networks. For example, if a mobile node roams away from a coverage area of the mobile node's home mobile access network, the mobile node may have an option of becoming attached to more than one visited access network. Whilst, conventionally mobile nodes are arranged to communicate data via a single wireless access interface standard such as UMTS/GPRS or WiFi, mobile nodes may also be arranged to communicate via a plurality of different interface standards or indeed fixed wire access networks. Therefore a mobile node may have an option of attaching to different mobile access networks, which operate in accordance with the same wireless access interface standard or different interface standards.

An operator of a mobile access network to which the mobile node is affiliated may wish to control the mobile access network to which the mobile node becomes attached. The operator may be motivated to control which access network is used for economic and/or network performance reasons. For example, in WO-A-03047296, a mobility manager of an operator network is provided with change of affiliation requests coming from a mobile node which are examined by the mobility manager. The mobility manager then makes a mobility decision regarding whether or not to change the affiliation of the mobile node to another access network. If so, the mobility manager controls the change of affiliation in accordance with that mobility decision.

SUMMARY OF THE INVENTION

According to an aspect of the present invention, there is provided a telecommunications system which provides a facility for mobile nodes to communicate via a plurality of mobile access networks. The telecommunications system comprises a network selection manager and a mobile node. The network selection manager is operable to determine a list of preferred mobile access networks to which the mobile node may be attached during an inactive state and to communicate the list of preferred mobile access networks to the mobile node. The inactive state of the mobile node is a state in which the mobile node is responsible for selecting a mobile access network to which the mobile node should attach. The list of preferred mobile access networks for selection is determined in accordance with operator determined conditions. The mobile node is operable in the inactive state to select one of the plurality of mobile access networks, which is available for attachment in dependence on the list of preferred mobile access networks communicated to the mobile node from the network selection manager.

Accordingly, the mobile node is responsible for actually selecting which access network to attach to at any given time, but the network operator, using the network selection manager, is able to influence the selection by the mobile node using the list of preferred access networks. This arrangement allows for network directed access network selection without a requirement for a substantial increase in signalling. Accordingly, if the mobile node is in an inactive mode, for instance when no communications session is being provided to the mobile node, the large signalling overhead usually associated with network controlled mobility management schemes is not incurred.

Although it will be appreciated that the present invention finds application with wireless access networks, embodiments of the present invention also find application with wired access networks, to which a mobile node may become connected. Embodiments of the present invention can provide an arrangement in which a mobile node is provided with a preferred list of access networks for attachment, when the mobile node is in an inactive state and therefore determines by itself the access network to which the mobile node should be attached. The phrase "inactive state" is used to describe a condition in which the mobile node is not currently communicating via the mobile access network. For example, in the inactive state the mobile node may not be providing a communications service to a user and is therefore not running an application program which can require that data is communicated via an access network to provide a service to a user. In a more conventional sense the inactive state can be regarded as a state in which the mobile node has been switched on, but is not currently communicating. As such, the mobile node changes affiliation by selecting or reselecting an access network for attachment, typically based on measurements performed by the mobile node such as a received signal strength indication with which a pilot or broadcast channel is received. Once attached to an access network the mobile node will receive calls, paging messages or invitations to initiate a communications sessions from the selected mobile access network, or indeed will place a call or initiate a communications session from the access network to which the mobile node is attached. In this sense the word "attached" is used to define an operation in which the mobile node is somehow affiliated with the access network to the effect that incoming communications sessions are initiated with the mobile node via that access network. The attachment of a mobile node to an access network could for instance include a decision process in the mobile node whereby an access network to which the mobile node is to become affiliated is selected, and optionally an access network attachment procedure, a core network attachment procedure, and an inter-access network location update. The access network attachment procedures will of course depend on the underlying access network, which will be different for different technologies. Depending on the access network, the access network attachment procedures, core network attachment procedures and inter-access network location update may or may not be applicable to a particular attachment decision.

In a situation in which only one access network is available to a mobile node, then clearly the mobile node will select this access network for attachment. If however, there is more than one access network available to the mobile node, such as for example in a situation in which a cellular mobile radio network and a wireless local area network are available, then the mobile node has a choice as to which access network the mobile node should attach itself. Conventionally, it is known for the selection of the access network to which the mobile node should attach to be typically based on a relative signal strength between the different access networks. In some examples, the selection of the access network may be based on a predetermined list of preferred access networks which is provided on a SIM card of the mobile node. Embodiments of the present invention can therefore provide an arrangement in which the selection of the access network to which an inactive mobile node should attach is influenced by providing a list of preferred access networks to the mobile node. The mobile node can then select the access network for attachment based upon the list of preferred access networks in combination with the access networks which are available to the mobile node. The mobile node can therefore select the most preferred access network which is available according to the list.

One or more resource managers may determine current loading conditions on a plurality of mobile access networks. The current loading conditions represent an amount of communications resources which are available to an access network but which are currently being used by mobile nodes which are communicating via that access network. Each resource manager is operable to communicate the determined loading conditions to the network selection manager. In this case, the operator determined conditions for generating the list of preferred access networks include conditions for providing a relative load balancing between the plurality of mobile access networks. In particular, the list of preferred mobile access networks is determined to provide a relative load balancing in dependence upon the current loading conditions of each of the plurality of mobile access networks as determined by the resource managers.

Other operator determined conditions may include the type of the mobile access network, and subscription information contained in a user profile associated with the user of the mobile node.

Various further aspects and features of the present invention are defined in the appended claims and include a network selection manager, a mobile node, a method of directing selection of access networks, and a computer program.

BRIEF DESCRIPTION OF THE DRAWINGS

Embodiments of the present invention will now be described, by way of example only, with reference to the accompanying drawings wherein like parts are provided with corresponding reference numerals and in which.

DESCRIPTION OF EXAMPLE EMBODIMENTS

Figure 1:
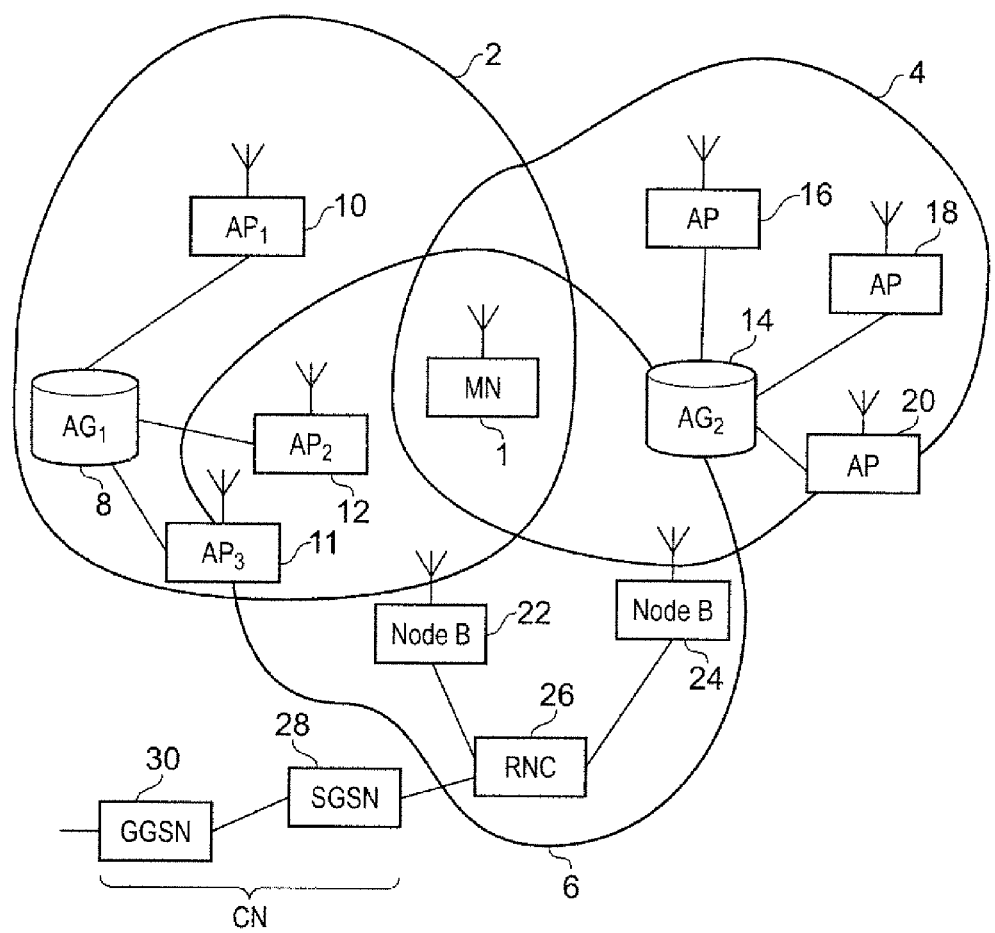
FIG. 1 schematically illustrates a telecommunications system in accordance with an embodiment of the present invention.

Example embodiments of the present invention will now be described with reference to a mobile node communicating via different wireless access networks. The wireless access networks may operate in accordance with different radio access network interface standards. For example, one network might be a wireless Local Area Network (LAN) such a WiFi or WiMAX, and another network might be a General Packet Radio Service/Universal Mobile Telecommunications System (GPRS/UMTS) network. An example situation in which an embodiment of the present invention could find application is shown in FIG. 1. In FIG. 1 a mobile node (MN) 1 is currently located in a position where it could communicate data via a first wireless access network (WLAN) 2, a second WLAN 4, or a GPRS network 6. As shown in FIG. 1 the first WLAN 2 comprises an access gateway 8, which is connected to three wireless access points 10, 11, 12 via which the mobile node 1 could communicate. In one example, the first WLAN 2 operates in accordance with the WiFi standard. Similarly, the second WLAN 4 comprises an access gateway 14, which is connected to three wireless access points 16, 18, 20. As illustrated by a coverage area provided by each of the first and second WLAN 2, 4 the mobile node could communicate via the first WLAN 2 or the second WLAN 4. For the example shown in FIG. 1 it is assumed that the second WLAN 4 is also operating in accordance with the WiFi standard.

The third wireless access network 6 operates in accordance with the UMTS/GPRS standard. According to this standard the wireless access network includes two node B's 22, 24 which are connected to a radio network controller (RNC) 26 and to an Serving GPRS Support Node (SGSN) 28 and Gateway GPRS Support Node (GGSN) 30 which form part of a core network of the GPRS/UMTS wireless access network 6.

According to the present technique, the mobile node MN 1 is provided with a list of preferred access networks to which it should attach when in an inactive state. As mentioned above, an inactive state is used to refer to a state in which the mobile node is not running any particular application to provide a communication service to the user of the mobile node, but instead is switched on and ready to make or receive calls or to initiate or receive an invitation to join a communication session. As such, as with a conventional operation of a mobile radio network, the mobile node when roaming throughout the network attaches to and detaches from base stations, node B's or access points within a particular access network in accordance with a relative signal quality of signals received from the respective access points, node B's or base stations.

For the example of GSM, the base stations communicate a Broadcast Control Channel (BCCH) which is detected by the mobile nodes. The mobile nodes can then determine which is the best signal quality from a received signal strength indicator of the BCCH broadcast signals and identify the associated base station. The mobile node can then decide which of the base stations, and therefore which of the wireless access networks, the mobile node should register with. Clearly, if only one access network is available then the mobile node does not have a choice in terms of which wireless access network the mobile node should become attached to. Furthermore, if the mobile node is within a coverage area of its home public land mobile radio network then the mobile node will attach to this home network in preference to any other network. However, if the mobile node roams outside a coverage area of its home network such as if the mobile node moves to a different country then the mobile node can select a mobile access network to which it should attach in accordance with a relative signal strength received in respect of broadcast communications from base stations of each of the different networks.

There are currently available and deployed a plurality of different wireless access networks. As indicated above, this could include a WiFi network, a WiMAX network, a 3G network or indeed a GPRS/UMTS network. The mobile node may therefore be arranged to include transceiver devices which are able to communicate on any of the interface standards according to these different wireless access networks.

As indicated above, in an inactive state the mobile node has responsibility for determining which access network it should be attached. However, embodiments of the present invention provide a facility for influencing the possible access networks to which the mobile node should become attached. Furthermore, according to the present technique the influencing of the access network to which the mobile node should become attached is effected in a way which does not require a significant amount of signalling traffic in order to provide the preferred list of access networks. One example embodiment of the present technique is shown in FIG. 2.

Figure 2:
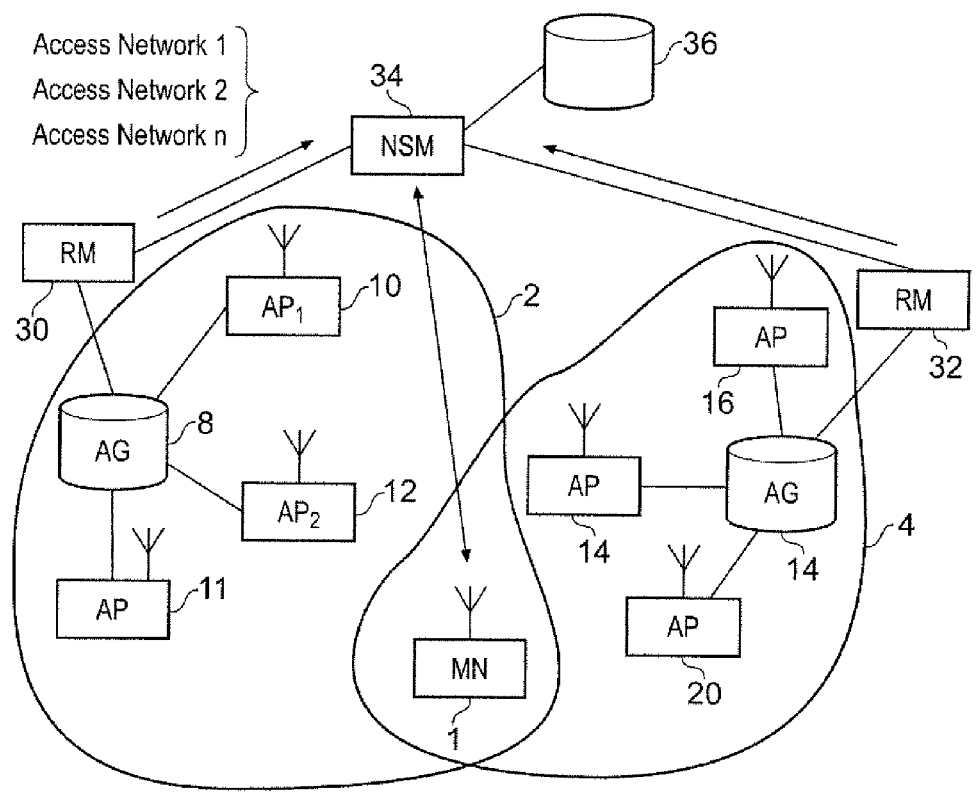
FIG. 2 schematically illustrates a telecommunications system having first and second access networks and a network selection manager in accordance with an embodiment of the present invention.

In FIG. 2 only the first and second WLAN's 2, 4 are shown for simplicity. However, in FIG. 2 a respective resource manager 30, 32 is associated with each of the wireless access networks 2, 4 and a network selection manager 34 is also provided in connection with the resource managers 30, 32. The network selection manager 34 also has associated therewith a database 36.

According to the present technique the network selection manager 34 is arranged to communicate a preferred list of access networks for use by the mobile node in determining to which access network it should become attached. Accordingly, when the mobile becomes active and initiates a call or receives a call then the mobile node will receive this call via the preferred access network. Thereafter of course the other operations and functions within the network such as mobility management may take over and direct the mobile node to a different access network in dependence upon for example the service which is being initiated. However, whilst in the inactive state when the mobile node can itself decide the access network to which it should attach. Providing a preferred list of access networks from the network selection manager to the mobile node allows the mobile node to determine the access network to which it should attach. For example, in accordance with a combination of a quality of received radio signals such as a broadcast signal or an access network alert signal in combination with the list of the preferred access networks the mobile node can select the access network which is available for communication and which is the highest on the list of preferred networks. Thus, for example, the mobile node could choose the access network which appears at the highest position on the list and is thus more preferred but which also provides an acceptable quality of received radio signals as measured by the mobile node.

As mentioned above, the network selection manager 34 compiles a list of preferred access networks for providing to each of the mobile nodes which has registered for this service with the network selection manager. The network selection manager could compile the list of preferred access networks in accordance with resources which are available on each of these access networks. For the example shown in FIG. 2, the resource managers 30, 32 may receive from the access gateways 8, 14 an indication of a current volume of communications traffic such as internet protocol communications via the access points 10, 11, 12, 16, 18, 20. The resource managers 30, 32 then generate access network evaluation messages (ANErm) providing an indication of a relative congestion on each of these access networks and an amount of communications resources available. The access network evaluation messages are then sent from the resource managers 30, 32 to the network selection manger 34.

In one example, the network selection manger 34 uses the access network evaluation messages to control congestion on each of these access networks with the effect that the network selection manger 34 identifies an access network with a lower amount of congestion as a more preferred access network than an access network with a higher amount of congestion. Thus, the network selection manager 34 effectively performs load balancing between the plurality of different access networks. So for the example shown in FIG. 1, if the resource managers 30, 32 indicate that the second access network 4 has a greater amount of congestion than the first access network 2, then the network selection manger 34 determines that the first access network is more preferred than the second access network and therefore places the first access network higher in the list of preferred access networks than the second access network. As such, the network selection manager 34 identifies the list of preferred access networks in accordance with a network operator's preferences which in this example is to reduce congestion on the second access network.

In some examples the database 36 can provide operator defined rules for identifying the list of preferred access networks. The operator defined rules (i.e. determined conditions) may prefer, for example, that the mobile node MN attaches to a cellular mobile network rather than a wireless IP network such as a WiFi network because the cellular network can provide greater roaming flexibility. Network selection manager 34 will determine the list of preferred access networks in accordance with the operator defined rules.

The network selection manager may communicate the list of preferred mobile access networks to the mobile node at regular intervals or in response to a request from the mobile node. Alternatively, the list of preferred mobile access networks may be communicated to the mobile node is response to a change in the list of the preferred mobile access network, thereby reducing the amount of signalling required. In this embodiment of the telecommunication system according to the invention, the list of preferred mobile access networks is updated dynamically as the list of preferred mobile access network evolves.

Figure 3:
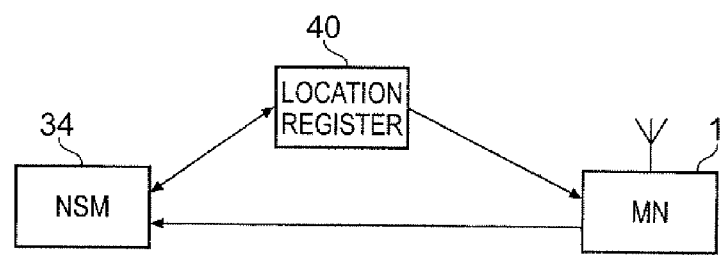
FIG. 3 schematically illustrates an embodiment of the present invention in which the network selection manager receives location information from a location register.

In other examples the network selection manager 34 may be arranged to specify the lists of preferred access networks in dependence upon a relative location of the mobile node MN. Thus the network selection manger 34 may receive data from a location register as illustrated in FIG. 3. In FIG. 3, a location register 40 forms part of a mobile access network such as for example the home location register (HLR) of a GSM network or a home subscriber server (HSS) of a Internet Protocol (IP) Multimedia Services (IMS) network. As with a conventional operation of a mobile access network, the location register receives and stores data identifying a current location of a mobile node. However, given that the mobile node may attach to a plurality of different types of access network, the location register 40 can perform a more global function of holding a location of the mobile node and a current access network to which it is attached. This information may be communicated to the location register 40 in the form of signalling messages from the access network or from the mobile node, which occur when the mobile node attaches to the access network as part of a registration procedure. In other examples, the location register 40 may form an inter-access system anchor which stores information identifying a current location of the mobile node. Similarly, for IP services providing mobility between mobile internet communications sessions and GSM, a voice call continuity server may be provided in order to anchor the mobile node in terms of providing an identification of its location.

Referring to FIG. 3, the network selection manager 34 therefore receives from the location register an indication of the location of the mobile node and therefore adjusts the lists of the preferred access networks in accordance with the mobile access networks which are available to the mobile node within that location. The location of the mobile node as stored in the location register 40 may be an identifier of a network entity to which the mobile node is affiliated, for instance a Node B. In this case, the network selection manager 34 will be aware of other access networks which compete with the identified Node B for inbound roaming mobile nodes and which therefore provide radio-coverage at the same location as the identified Node B. The network selection manager 34 is therefore able to adjust the lists of preferred access network in accordance with the competing access networks. The location of the mobile node may be identified as a particular geographical information based on knowledge of the geographical area to which the radio-coverage of the Node B relates. In this case, further network entities providing network topology information would be provided. Thus if any particular access networks are available in a particular location or if one access network is preferred over another access network in a particular location then this may be used to compile the list of preferred access networks for sending to the mobile node. In addition, in order to communicate the network selection configuration message, the network selection manager 34 may interrogate the location register in order to identify the location of the mobile node, to communicate the network reselection message to the mobile node.

SUMMARY OF OPERATION

Figure 4:
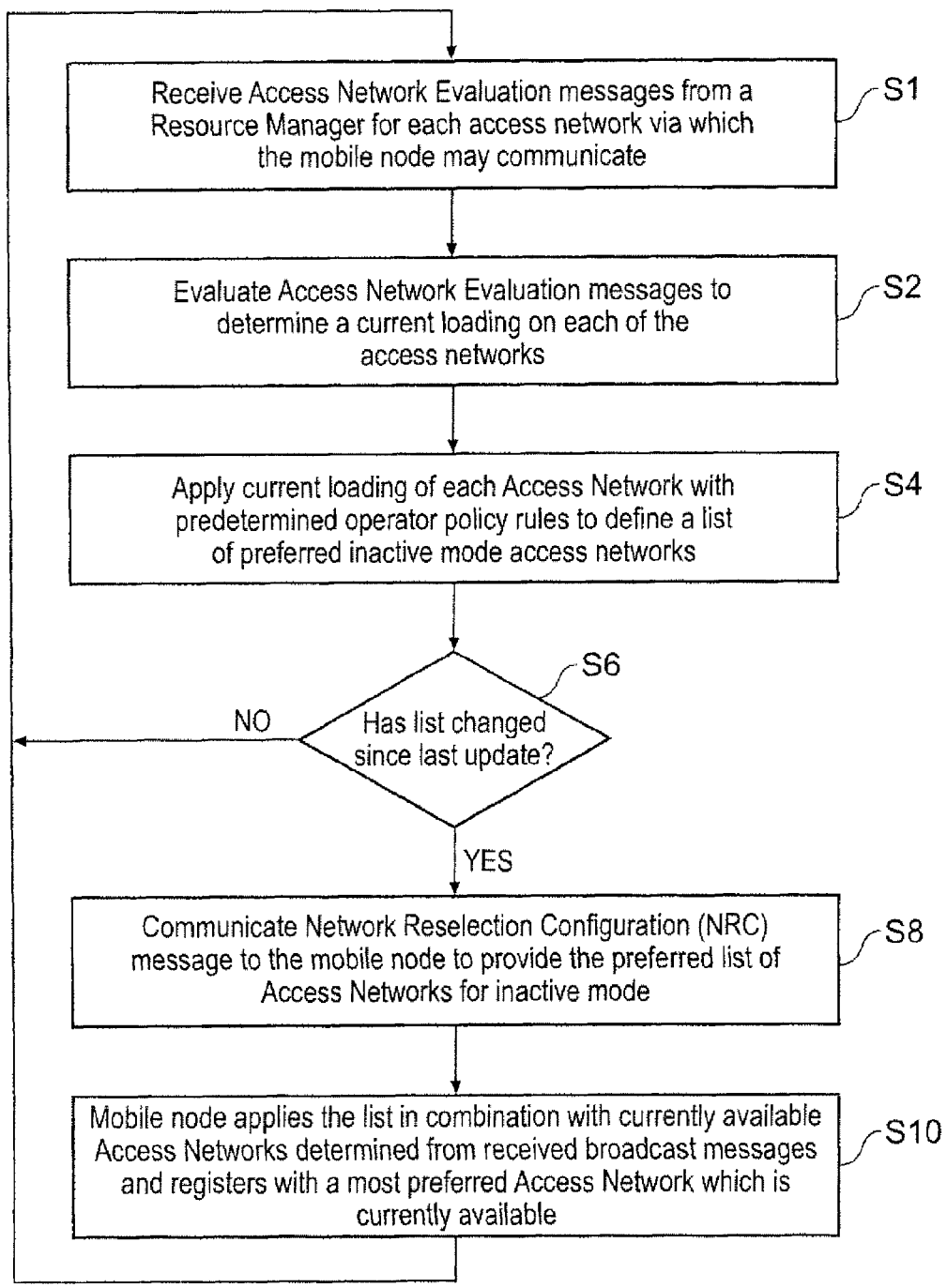
FIG. 4 is a schematic flow diagram illustrating a method of directing selection of access networks in accordance with an embodiment of the present invention.

FIG. 4 provides a flow diagram summarising the operation of the network selection manager 34 in combination with a mobile node MN in order to arrange for the mobile node to attach to a preferred access network. FIG. 4 is summarised as follows:

S1: The network selection manager receives access network evaluation messages from one or more resource managers which are associated with a plurality of access networks via which the mobile node may communicate. As such, a resource manager may be assigned to more than one access network. Of course, this step is optional since the network selection manager may select the preferred access networks in accordance with decision criteria which are not based on the currently available resources of the access networks.

S2: The access network evaluation messages are received by the network selection manger and analysed in order to determine a current loading on each of the access networks. In accordance with the evaluated current loading, the network selection manager is arranged to determine a relative distribution of communications resources to identify whether one access network has more communications resources available than another access network. Similarly, one access network may indicate that it is currently heavily congested and as a result, should not be considered as a preferred access network on which the mobile node should "camp" in an inactive state.

S4: The network selection manger then applies the current loading of each access network in accordance with a predetermined operator policy rule to define a list of preferred inactive node access networks. Thus, the network selection manager receives the policy rules from the data store and in combination with the identified resources available between the different access networks forms a list of access networks which are preferred. The access networks may be listed in the order in which they should be presented to the mobile node.

S6: The network selection manager then determines whether the list of preferred access networks has changed since the list was last sent to the mobile node. Accordingly, if a list has not changed since the preferred list was last sent to the mobile node then processing proceeds to the start of the flow chart with step S1. If the list has changed then processing proceeds to step S8.

S8: The preferred list of access networks is communicated using a network selection configuration (NRC) message to the mobile node to provide a preferred list of access network for the inactive state of the mobile node. The method by which the NRC message is communicated to the mobile node could be transparent to the network selection manager, for instance if the mobile node has a permanent address and other network entities take care of the routing of messages addressed to the permanent address. Alternatively, the network selection manager could manage the routing itself, by determining the current location of the mobile node from the location register.

S10: Once the mobile node has received the preferred list of access networks, the mobile node applies the list in order to identify an access network to which it should attach. In particular, the mobile node may for example measure a received signal strength of signals broadcast by each of the access networks in order to determine which access networks are available in the sense that they can provide a minimum quality of service. The access networks which are able to provide a minimum quality of service are then compared to the list of preferred access networks. The access network providing at least the minimum quality of service which is highest on the list and therefore most preferred is selected as the network on which the mobile node should camp or register for receiving or initiating calls.

Enabling the operator to assist a mobile node in the selection/reselection of an access network during an inactive state enables the mobile node to enter an active state on an access network which is suitable from the perspective of both the user of the mobile node and the operator. This has beneficial consequences for load balancing between access networks, improved control over Quality of Service (QoS) to users of mobile nodes by avoiding selection of congested access networks, and allowing for prioritisation of users in various classes depending on their subscription. Additionally, it becomes possible to implement detailed and sophisticated operator policies without a need for the mobile node to be aware of these policies, and for the network operator rather than the mobile node vendor to control access network selection policies. These benefits arise without the need for an exchange of signalling messages between the mobile node and the network.

Various further aspects and features of the present invention are defined in the appended claims. Various modifications may be made to the embodiments of the invention herein described without departing from the scope of the present invention defined in the appended claims. For example although in the example embodiments the mobile node MN is communicating via wireless access networks, the present invention can equally be applied to the situation in which one of the access networks is available via a wired network for example via a cable modem. Furthermore, it will be appreciated that the present invention finds application with any type of wireless or wired access network in which a mobile node has the choice of possible access networks on which it should attach in an inactive state. Additionally, while the present invention is particularly applicable to mobile nodes in an inactive state, it could also be applied to active terminals in roaming situations as a mobility management scheme.

The invention claimed is:

1. A telecommunications system for facilitating mobile nodes to communicate via a plurality of mobile access networks, each having a gateway and a plurality of access points for communicating with the gateway and the mobile nodes, the telecommunications system comprising:
a network selection manager configured to:
receive access network evaluation messages from one or more resource managers, which are associated with the plurality of access networks via which the mobile node may communicate,
analyze the access network evaluation messages in order to determine a current loading on each of the access networks,
apply the current loading of each access network in accordance with one or more operator defined conditions, including a predetermined operator policy rule, to generate an updated list of preferred mobile access networks, and
communicate to a mobile node the updated list of preferred mobile access networks to which the mobile node may be attached during an inactive state, wherein the network selection manager is configured to communicate dynamically the updated list of preferred mobile access networks to the mobile node in response to a change in the list of preferred mobile access networks since a last updated preferred list was previously communicated to the mobile node.

2. The telecommunications system according to claim 1, comprising the one or more resource managers to determine and communicate the current load conditions on the plurality of mobile access networks to the network selection manager, through the access network evaluation messages,
wherein the operator policy rule comprises a rule providing a relative load balancing between the mobile access networks, the list of preferred mobile access networks includes relative load balancing in dependence upon the current load conditions of each of the plurality of mobile access networks.

3. The telecommunications system according to claim 1, wherein the operator defined conditions include at least one of a type of the mobile access network or subscription information associated with a user of the mobile node.

4. The telecommunications system according to claim 1, comprising a location monitor to monitor and to communicate the location of the mobile node to the network selection manager as one of the one or more conditions.

5. A network connected selection manager device provided as part of a telecommunications system which enables mobile nodes to communicate via the plurality of mobile access networks, each having a gateway and a plurality of access points for communicating with the gateway and the mobile nodes, the selection manager device comprising:
a communication device configured to communicate with a mobile node; and
a portion configured to:
receive access network evaluation messages from one or more resource managers, which are associated with the plurality of access networks via which the mobile node may communicate,
analyze the access network evaluation messages in order to determine a current loading on each of the access networks,
apply the current loading of each access network in accordance with one or more operator defined network conditions, including a predetermined operator policy rule, to generate an updated list of preferred mobile access networks, and
communicate to the mobile node, with the communication device, the updated list of preferred mobile access networks to which the mobile node may be attached during an inactive state of the mobile node, wherein the portion is configured to communicate dynamically the updated list of preferred mobile access networks to the mobile node in response to a change in the list of preferred mobile access networks since a last updated preferred list was previously communicated to the mobile node.

6. A mobile node operable to communicate via a plurality of mobile access networks within a telecommunications system, each network having a gateway and a plurality of access points for communicating with the gateway and the mobile node, the mobile node comprising:
an active state and an inactive state;
a transceiver device configured to communicate with the plurality of mobile access networks; and
a first portion configured to:
receive from a network connected selection manager device an updated list of preferred mobile access networks to which the mobile node may be attached during the inactive state, the updated list being a function of access network evaluation messages received by the network selection manager from one or more resource managers, which are associated with a current loading of the plurality of access networks via which the mobile node may communicate, and in accordance with one or more operator defined network conditions, including a predetermined operator policy rule, wherein the mobile node is configured to receive dynamically the updated list of preferred mobile access networks from the network selection manager in response to a change in the list of preferred mobile access networks since a last updated preferred list was previously communicated to the mobile node; and
a second portion configured, in the inactive state, for selecting a mobile access network to which the mobile node should attach through the transceiver device.

7. A method for facilitating mobile nodes to communicate via a plurality of mobile access networks, each having a gateway and a plurality of access points for communicating with the gateway and the mobile nodes, the method comprising acts of:
on a network connected selection manager device:
receiving access network evaluation messages from one or more resource managers, which are associated with the plurality of access networks via which the mobile node may communicate,
analyzing the access network evaluation messages to determine a current loading on each of the access networks,
applying the current loading of each access network in accordance with using one or more operator defined network conditions, including a predetermined operator policy rule, to generate an updated list of preferred mobile access networks, and
communicate to a mobile node the updated list of preferred mobile access networks to which the mobile node may be attached during an inactive state, wherein the network selection manager is communicates dynamically the updated list of preferred mobile access networks to the mobile node in response to a change in the list of preferred mobile access networks since a last updated preferred list was previously communicated to the mobile node; and in the inactive state, the mobile node selecting a network to which to attach from the updated list of preferred mobile access networks determined in accordance with the operator defined network conditions.

8. At least one computer readable non-transitory memory medium including computer executable instructions which when loaded onto at least one network connected computer cause the at least one computer to perform a method for facilitating mobile nodes to communicate via a plurality of mobile access networks, each having a gateway and a plurality of access points for communicating with the gateway and the mobile nodes, the instructions comprising:

instructions at a network connected selection manager computer, which configure the network selection manager to:

receive access network evaluation messages from one or more resource managers, which are associated with the plurality of access networks via which the mobile node may communicate, analyze the access network evaluation messages to determine a current loading on each of the access networks, apply the current loading of each access network in accordance with one or more operator defined network conditions, including a predetermined operator policy rule, to generate an updated list of preferred mobile access networks, and communicate to a mobile node the updated list of preferred mobile access networks to which the mobile node may be attached during an inactive state, wherein the network selection manager communicates dynamically the updated list of preferred mobile access networks to the mobile node in response to a change in the list of preferred mobile access networks since a last updated preferred list was previously communicated to the mobile node; and instructions on the mobile node, which configure the mobile node, when in the inactive state, to select a mobile access network to which to attach from the updated list of preferred mobile access networks determined in accordance with the operator defined network conditions.

* * * * *

UNITED STATES PATENT AND TRADEMARK OFFICE
CERTIFICATE OF CORRECTION

| | | |
|---|---|---|
| PATENT NO. | : 8,837,306 B2 | Page 1 of 1 |
| APPLICATION NO. | : 12/439400 | |
| DATED | : September 16, 2014 | |
| INVENTOR(S) | : Vigue et al. | |

It is certified that error appears in the above-identified patent and that said Letters Patent is hereby corrected as shown below:

In the claims:

Column 10:

Claim 7, line 65, after "manager" delete "is".

Signed and Sealed this
Nineteenth Day of January, 2016

Michelle K. Lee
*Director of the United States Patent and Trademark Office*